United States Patent [19]
Bestler et al.

[11] Patent Number: 5,231,664
[45] Date of Patent: Jul. 27, 1993

[54] CABLE SYSTEM HAVING MULTIPLE BARKERING

[75] Inventors: Caitlin B. Bestler, Chicago; Mack S. Daily, Round Lake Park, both of Ill.

[73] Assignee: Zenith Electronics Corporation, Glenview, Ill.

[21] Appl. No.: 792,340

[22] Filed: Nov. 14, 1991

[51] Int. Cl.⁵ ............................................. H04L 9/00
[52] U.S. Cl. .................................... 380/20; 358/142
[58] Field of Search .................... 380/10, 20; 358/142, 358/143, 145

[56] References Cited

U.S. PATENT DOCUMENTS

Re. 31,735  11/1984  Davidson ............................ 380/20
4,971,379   9/1984  Stephens ............................. 380/20
5,003,591   3/1991  Kauffman et al. ................... 380/10

Primary Examiner—Salvatore Cangialosi

[57] ABSTRACT

A cable television system includes a headend unit having a plurality of program signal sources, encoders, scrambling circuits, and channel modulators for producing a plurality of program channels modulated at a corresponding plurality of cable system carrier frequencies. An address computer within the headend unit is operative upon the encoders to provide the insertion of a message packet within the vertical blanking interval of the program signals. The scrambler circuits render the program signal unviewable by conventional television receivers. A cable system decoder is coupled to the headend by a cable and includes a conventional tuner, intermediate frequency amplifier and detector. A decoder processor is coupled to a channel selection input and to the tuner to provide channel selection in accordance with a user input. The decoder processor examines the message packet during the vertical blanking interval to determine authorization of the decoder to display the received program channel. A descrambler is coupled to the processor and the tuner IF and detector to descramble the program signal if authorization is detected. A modulator modulates the descrambled signal upon a fixed channel carrier for application to a conventional television receiver.

15 Claims, 3 Drawing Sheets

CABLE SYSTEM HAVING MULTIPLE BARKERING

FIELD OF THE INVENTION

This invention relates generally to cable television systems and particularly to the channel barkering systems used therein.

BACKGROUND OF THE INVENTION

Cable television systems provide a method of television signal distribution between a central facility generally referred to as the "headend", and a large number of television viewers through a cable distribution system. The headend includes the source of programming information together with a plurality of television channel modulators which provide a plurality of television program signals at different channel frequencies. The plurality of program channel signals are communicated to the individual television viewers via a network of cables, distribution equipment, and individual signal decoders at each user location. Early cable television systems were usually limited to one-way cable systems so named because all communication occurred from the headend down through the system to the individual decoders. Later developed systems provided communication capability in both directions between the headend and encoders and are thus referred to as two-way cable television systems. For purposes of convenience, communications and information transmission from the headend to the user decoders is generally referred to as "downstream" communication while the transmission of information and data from the user decoders to the headend of the system is referred to as "upstream" communication.

Downstream signals or communication typically include program information together with appropriate television scan synchronizing information plus additional data such as subscriber addresses or program authorization. This additional data is usually combined with the program information during the vertical blanking interval of the signal. Typical upstream signals or information may include program purchases or other relevant information such as responses to status inquiry or polling information requests.

In most cable television systems, the various program channels are grouped into basic service channels together with special optional channels which require additional service fees or payments to be received by the viewer. The latter are generally referred to as channels or programs and may be received and displayed solely by those decoders within the cable system which are authorized to view them. In virtually all cable television systems, the need for authorization to receive and display pay per view programming is enforced by the use of scrambled signals on pay per view channels. At the headend of the system, a signal scrambler is operative upon the program information to alter it in a manner rendering it virtually unviewable when applied unchanged to a television receiver. At the decoder, a corresponding descrambler is operative to unscramble the program information and return it to the proper television format for viewing on a conventional television receiver. The headend further includes an address computer and signal encoder which cooperate to insert the program authorization information for the pay channel within the vertical blanking interval. Correspondingly, the encoder includes systems for responding to the authorization information within the vertical blanking interval to activate the descrambler once the proper authorization signal is received.

When a cable television viewer attempts to receive a particular program channel, the encoder is tuned to the selected channel and the encoder determines whether the appropriate authorization code is present during the program signal vertical blanking interval. The presence of the appropriate authorization code indicates that the decoder is authorized to receive the pay program information and the descrambler is activated and the program information is properly displayed. If, however, the correct authorization code is not carried within the program signal, the decoder is not authorized to receive the pay per view program and the signal will not be descrambled. In some cable television systems, unauthorized pay programs are simply displayed in their scrambled form and are thus unviewable. In other systems, however, a viewer request for an unauthorized pay signal causes the decoder to be switched to an alternate channel which provides additional information to the viewer. Such alternate channels are generally referred to as "barker" channels and the process of automatically switching to such alternate channels is generally referred to as "barkering". In their simplest form, barker channels may simply display information to the viewer indicating that the viewer is not authorized to receive the selected program and may suggest that the viewer subscribe to the pay channel.

In some cable television systems, the viewer, having selected an unauthorized program channel, is afforded the opportunity to obtain authorization immediately in a process often referred to as individual or impulse pay per view. In one impulse pay per view system, the barker channel instructs the viewer to utilize a conventional telephone to call the cable headend and thereby obtain authorization. In other cable television systems having two-way communication, the barker channel may instruct the viewer to respond appropriately by using the upstream communication of the cable television system itself.

Once the user has responded appropriately in the impulse pay per view situation and obtained authorization, the user then switches the decoder back to the selected program channel and attempts again to receive the desired program information.

While the present barkering systems provide some benefit in cable television systems and facilitate individual or impulse purchasing of pay per view programming, they remain subject to several problems and limitations. Perhaps the most significant arises out of the timing required on the part of the viewer to carry out the impulse purchase. For example, in the event the viewer attempts to return to the selected program channel from the barkering channel too quickly, the program authorization may not have been completed resulting in return to the barkering channel and viewer confusion. By way of further example, in the event the user attempts to return to the selected program channel while authorization is taking place, the necessary communication link between the decoder and the headend is interrupted and authorization may again fail. In some two-way systems, the requested transaction is implicitly identified by the channel tuned. In such systems, correct identification of the desired program would require the use of a separate barker channel for each pay per view program. This would increase costs and complexity of the barkering system.

Accordingly, it is a general object of the present invention to provide improved cable television system barkering. It is a more particular object of the present invention to provide improved cable television system barkering which is more user friendly to the viewer and which minimizes confusion of the viewer.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
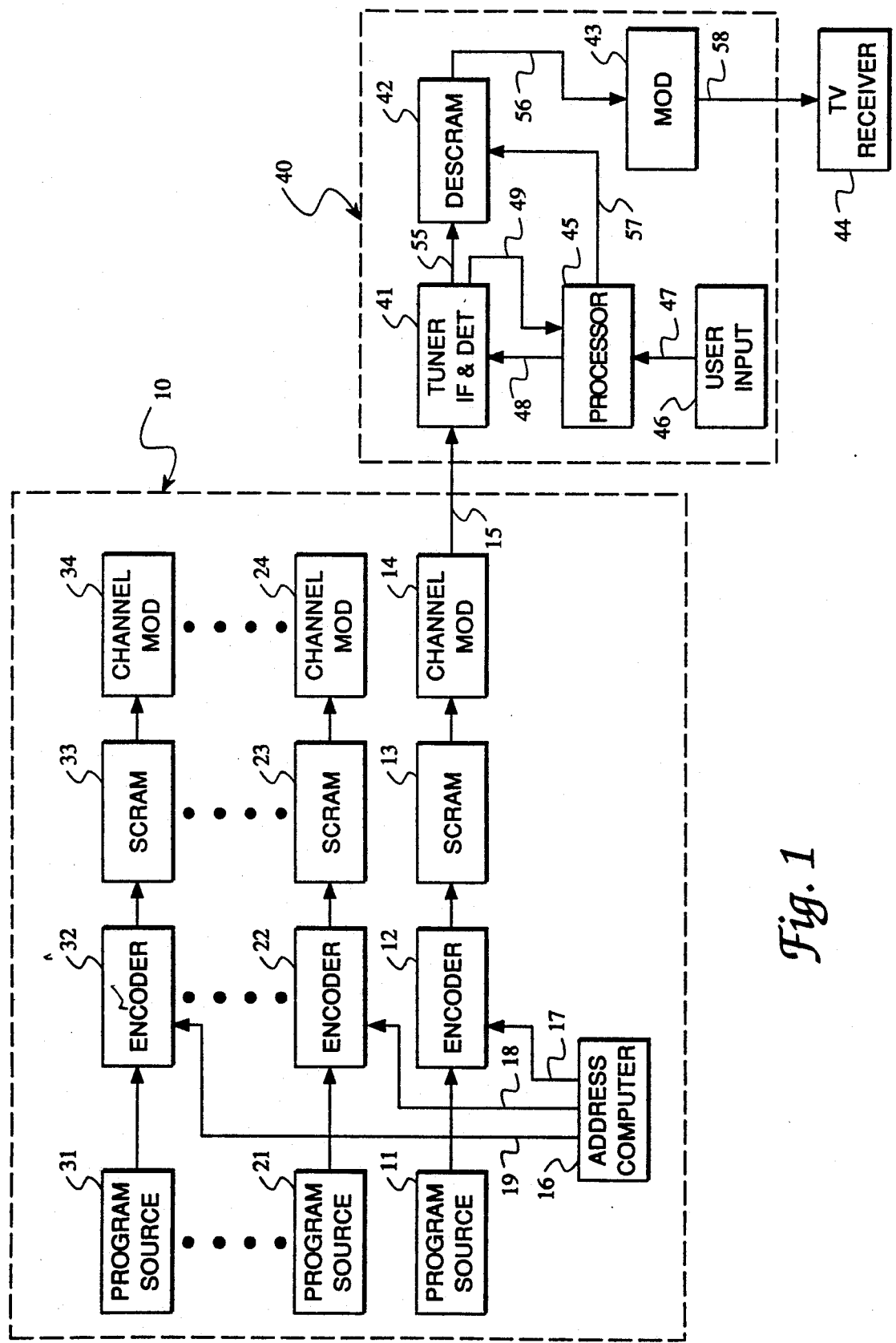
FIG. 1 sets forth a block diagram of a cable television system constructed in accordance with the present invention.

FIG. 1 sets forth a block diagram of a cable television system having multiple barkering and constructed in accordance with the present invention. The headend or master program source is shown within dashed line 10 while a single viewer decoder is shown within dashed line 40. Also shown is a television receiver 44 located at the viewer's location. A cable 15 is shown coupled between headend 10 and decoder 40. It will be recognized by those skilled in the art that a single decoder 40 is shown coupled to headend 10 by a simple cable 15 solely for purposes of illustration. It will also be recognized that, in practice, a great number of decoders which may be similar or identical to decoder 40 will be coupled to a single headend 10 through a complex distribution network in place of the simplified coupling of cable 15.

More specifically, headend 10 includes a program source 11 coupled to an encoder 12, the output of which is coupled to a channel modulator 14 through a scrambling circuit 13. Channel modulator 14 is coupled to cable output 15. An address computer 16 includes a communication line 17 coupled to encoder 12. A similar program source 21 is coupled to an encoder 22 which in turn is coupled to a channel modulator 24 by a scrambling circuit 23. The output of channel modulator 24 is also coupled to cable 15. Address computer 16 includes a communication line 18 coupled to encoder 22. In the anticipated fabrication of a typical headend unit, a great number of program sources such as program sources 11 and 21 will be used each having their respective encoders, scramblers and channel modulators for placing the program information upon the cable system. Accordingly, a program source 31, an encoder 32, descrambler 33 and channel modulator 34 coupled to cable 15 represent these further numbers of program sources. By further similarity, address computer 16 includes a communication line 19 coupled to encoder 32.

In operation, program source 11 provides the program source material such as video and sound information suitable for presentation on television receiver 44. In accordance with conventional fabrication techniques, program source 11 further provides conventional horizontal and vertical scan synchronizing signals to form a composite video and sound signal which is applied to encoder 12. Address computer 16 produces a message packet of operational and control information which includes program authorization and which is described below in greater detail. Suffice it to note here that the message packet is particularly structured for the operation of the various decoders within the cable television system. In its preferred operation, address computer 16 provides this message packet to encoder 12 via a coupling line 17 such that encoder 12 and address computer 16 cooperate to insert the message packet within the vertical blanking interval of the signal provided by program source 11. Scrambler 13 includes conventional scrambling circuitry for altering the video signal from program source 11 and, in some instances, the scan synchronizing signals therein to produce scrambled program source signals which are not properly displayed upon a television without appropriate descrambling at the decoder. The type of scrambling performed by scrambler 13 is largely a matter of system design choice and may vary from relatively simple sync signal suppression and/or video inversion to more complex systems which provide random and pseudorandom scrambling techniques. In any event, the scrambled program source signal together with the inserted message packet during the vertical blanking interval is applied to a conventional channel modulator 14 which modulates the scrambled and encoded baseband signal from program source 11 upon a television carrier signal. This modulated carrier signal is then applied to output cable 15 for transmission to the distribution system (not shown) and ultimately to be received by the system decoders such as decoder 40.

As mentioned, a typical headend system provides a substantial number of television programs at different channel frequencies upon the cable system. Accordingly, program source 21, encoder 22 and scrambler 23 function in the same manner as program source 11, encoder 12 and scrambler 13 to provide a scrambled program source signal having the appropriate message packet inserted during the vertical blanking interval. Channel modulator 24 modulates this scrambled signal upon a carrier frequency different from channel modulator 14 and applies it to cable 15. Similarly, the remaining program sources such as program source 31 and their respective encoders and scramblers such as encoder 32 and scrambler 33 operate to provide additional scrambled program signals which are modulated upon individual carriers by their respective channel modulators such as modulator 34. Thus, through the operation of headend 10, cable 15 carries a plurality of program signals upon a corresponding plurality of channel frequencies which may be commonly applied to the many decoders within the cable television system.

Decoder 40 includes a front end 41 having a tuner, IF amplifier, and video detector all constructed in accordance with conventional fabrication techniques. A processor 45 is coupled to front end 41 by a channel select coupling 48. The output of the detector within front end 41 comprises the scrambled baseband video signal and inserted message packet produced at the headend which is coupled to a descrambler 42 by a coupling 55 and to processor 45 by a coupling 49. Processor 45 is further coupled to descrambler 42 by a coupling 57. A user input device 46 is coupled to processor 45 by a coupling 47. The output of descrambler 42 is coupled to a channel modulator 43 by a coupling 56 which in turn is coupled to a television receiver 44 by a coupling 58.

In operation, the tuner, IF and video detector within front end 41 function in accordance with conventional fabrication techniques to frequency select the desired program channel from cable system 15 and to recover the baseband video and sound signals therefrom. User input 46 may, for example, comprise a channel selection keyboard through which the user inputs the desired channel number. The channel number is communicated to processor 45 as a digitally encoded signal. Processor 45 then converts the input channel selection signal to an appropriate control signal which is applied to the tuner within front end 41 to select the desired program channel. As mentioned above, the baseband signal originally modulated upon the program channel frequency has usually been altered or scrambled. Accordingly, the baseband video and sound signal at the output of the video detector within front end 41 is correspondingly scrambled and, thus, generally not viewable on a conventional television receiver without first being restored to its original format. Thus, the output signal of the video detector within front end 41 is processed through a descrambler 42 which provides the necessary restoration of the baseband video and sound signal to its original program format which may then be utilized by a conventional television receiver. The operation of descrambler 42 is controlled by processor 45 in accordance with the operation set forth below in greater detail. Finally, the descrambled baseband video and sound signal is modulated upon a selected television carrier signal and applied to television receiver 44. In accordance with conventional cable system operation, modulator 43 is a fixed modulator operating at a single frequency such as channel three or channel four and, correspondingly, television receiver 44 remains set to receive the channel frequency of modulator 43. Thus, all channel selection by the viewer is implemented using decoder 40 rather than the channel selection apparatus of television receiver 44.

In accordance with conventional cable television system operation, certain program channels are produced at headend 10 as part of the basic cable service and thus are intended to be received by all decoders and displayed on all television receivers. Such signals may be distributed without scrambling or may be continuously authorized by the inverted message used therein. Conversely, other program channels may be intended to be viewed only by those viewers who have paid additional service fees to receive such programs. These program channels are generally described as pay per view program channels and require that the user's decoder be authorized to receive and descramble the program information. Headend unit 10 controls the pay per view operation of each system decoder including decoder 40 in a process known as authorization. It should be recalled that address computer 16 provides a message packet to the encoders within the headend system for insertion into the vertical blanking interval of the program signal. Correspondingly, processor 45 is operative to receive and examine the message packet within the vertical blanking interval to determine whether decoder 40 is authorized to receive the particular program channel requested by the user. In the event decoder 40 is authorized to receive the selected program channel, processor 45 produces an enabling signal which is coupled to descrambler 42 by coupling 57. In response, descrambler 42 is enabled and provides a reciprocal operation to that of the scrambling circuits within headend 10 to restore the baseband video signal to the standard format. Once descrambled, the baseband signal is then modulated by modulator 43 upon a carrier and processed for viewing by television receiver 44. If, however, decoder 40 is not authorized to receive the selected program channel, processor 45 is operative in accordance with the present invention, described below in greater detail, to determine whether the viewer may be eligible to obtain authorization and thereby view the selected program channel. In order to instruct the viewer as to the manner in which authorization may be obtained or to advise the viewer that the selected program channel is not authorized, processor 45 implements the present invention barkering system. As is mentioned above, barkering is well known in cable television systems and basically involves switching the decoder to an alternate program channel upon which instructional or promotional information is presented. In accordance with the present invention, however, the barkering process carried forward by processor 45 provides significant advantage over prior art barkering systems. In an important step, processor 45 operates to store the originally requested program channel selected by the user while the barkering process is carried forward. Processor 45 then examines the message packet within the received signal to determine which barkering channel among several possible barkering channels is appropriate. Thereafter, processor 45 produces a frequency selection signal which is coupled to the tuner within front end 41 to switch the tuner to the appropriate barker channel.

Thus, for example, in the event the viewer has originally selected an unauthorized program channel corresponding to program source 11 and barkering is required, processor 45 stores the viewer selection number for program source 11 while switching the tuner within front end 41 to the channel frequency corresponding to the appropriate barkering channel. By way of further example, this barkering information may be provided by program source 31 and modulated by channel modulator 34. Thus, decoder 44 during barkering switches to the channel frequency of modulator 34 and functions to apply the program source information from program source 31 to modulator 43 for display upon television receiver 44. In further accordance with the present invention, the originally selected program channel number is maintained within processor 45 during the barkering process and is used by processor 45 to automatically return the tuner within front end 41 to the originally selected program channel once the viewer has responded properly and obtained authorization. In further accordance with the present invention, processor 45 selects the appropriate one of several barkering channels within headend 10 based upon the authorization level required for the program channel. For example, certain program information may be designated by the cable system provider as impulse pay per view in which it is intended that subscribers be accorded the opportunity to update their authorization status and be able to receive this program immediately. In contrast, other pay per view programs may be intended to be viewed solely by those subscribers which have previously obtained authorization and no opportunity for impulse pay per view be presented. In such case, the processor 45 is operative to determine which authorization level exists as well as the authorization status of decoder 40 and select from among a plurality of barkering channels to provide the viewer with the appropriate information The resulting system uses multiple barkering to more clearly communicate with and instruct the viewer and to facilitate the decoder's automatic return to the selected program channel once authorization is provided without viewer channel switching. In addition, the present invention system facilitates the use of the same barkering channel for a plurality of program channels thereby avoiding the need for individual barkering for each program channel.

Figure 2:
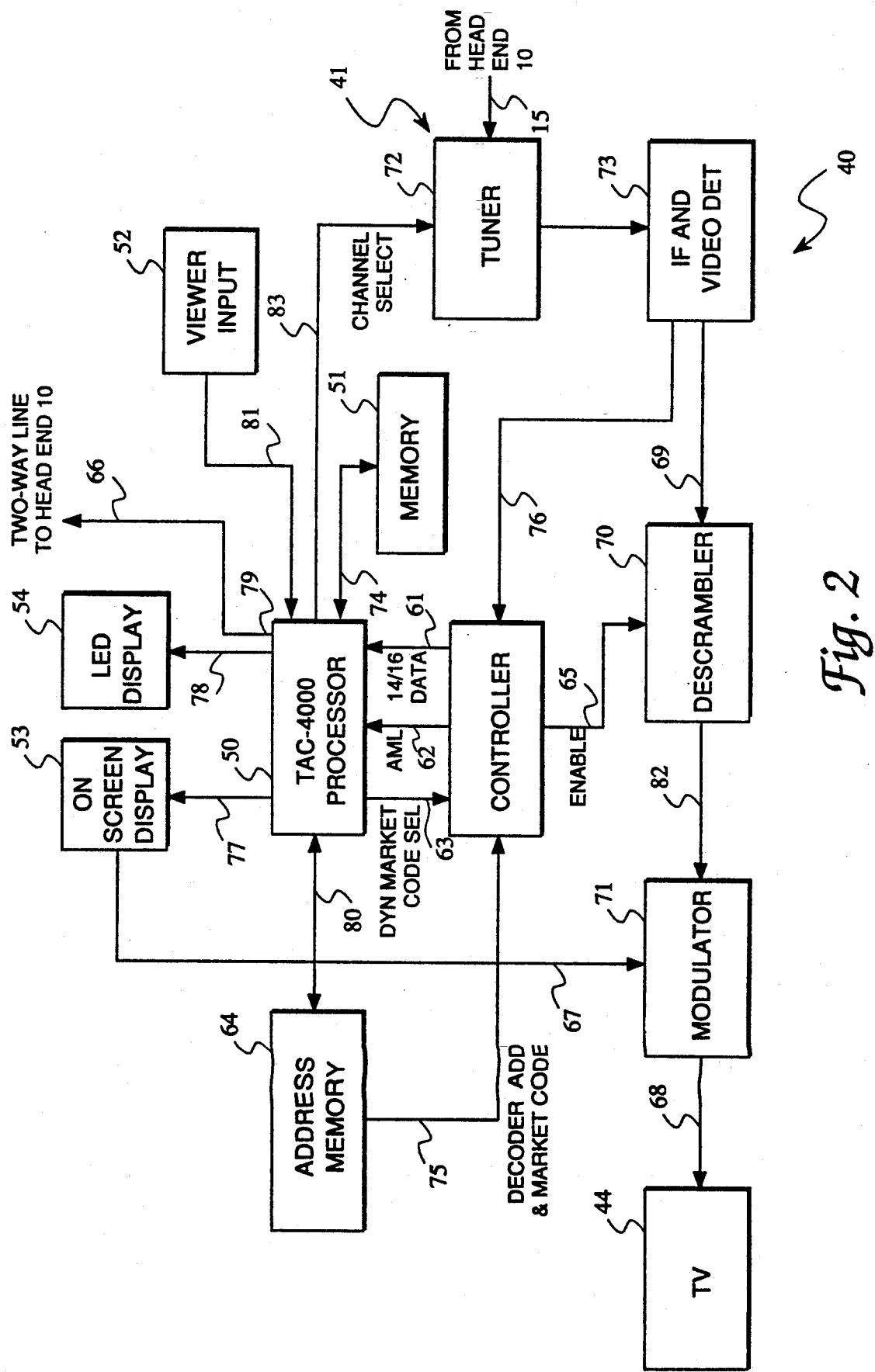
FIG. 2 sets forth a block diagram of a cable television decoder constructed in accordance with the present invention.

FIG. 2 sets forth a block diagram of decoder 40 together with a conventional television receiver 44. Decoder 40 includes a tuner 72 coupled to headend 10 (seen in FIG. 1) by a cable 15. An IF and video detector circuit 73 is coupled to tuner 72 to complete front end 41. Video output line 69 of IF and video detector 73 is coupled to a descrambler circuit 70 which in turn is coupled to a modulator 71 by a coupling 82. The output of modulator 71 is coupled to a conventional television receiver 44 by a connection 68. A controller 60 is coupled to the output of IF and video detector 73 by a coupling 76 and to descrambler circuit 70 by an output coupling 65. A processor 50 includes an associated memory 51 coupled to processor 50 by a bidirectional coupling 74. An address memory 64 is coupled to processor 50 by a bidirectional coupling 80 and is coupled to controller 60 by a coupling 75. Processor 50 is further coupled to controller 60 by an output line 63 and a pair of input lines 61 and 62. A viewer input circuit 52, which in its preferred form includes a channel input keyboard selection circuit, is coupled to processor 50 by a communication line 81. A two-way information channel 66 is coupled to output 79 of processor 50. It should be noted that while communication line 66 is shown separate from cable 15, it may in fact comprise an additional television communication channel frequency between processor 50 and headend 10 rather than an individual coupling. An LED display circuit 54 includes conventional LED display segments and driver systems therefor and is coupled to processor 50 by a coupling line 78. An on-screen display circuit 53, constructed in accordance with conventional fabrication techniques, is coupled to processor 50 by a coupling 77 and to modulator 71 by a coupling 67.

In operation, headend 10 (seen in FIG. 1) transmits a plurality of program channel signals via cable 15 which are received by tuner 72. Channel selection is initiated by viewer operation of input 52 to produce a channel selection signal which is applied to processor 50. In response, processor 50 produces a corresponding channel select signal which is coupled to tuner 72 by output 83 and which configures tuner 72 to frequency select the desired program channel from the plurality of program channels on cable 15. The selected program channel signal is processed by IF and video detector 73 to produce a baseband video and audio signal which is coupled to both controller 60 and descrambler 70. In addition, processor 50 produces the appropriate output signals for configuring LED display 54 to show the selected channel number originally applied by the viewer at viewer input 52. In some circumstances, processor 50 may also produce appropriate output information signals on line 77 which are used by on-screen display 53 to provide appropriate alphanumeric display characters on the screen of television receiver 44.

As mentioned above, the received program signal includes a message packet inserted into the program signal during the vertical blanking interval. Correspondingly, controller 60 is configured to recover the message packet from the baseband video signal. While the structure of the message packet transmitted during the vertical blanking interval is, to some extent, a matter of design choice, it has been found advantageous in the present invention system to configure the initial portion of the message packet to include the individual identifying address for decoder 40. The latter uniquely identifies decoder 40 among all the remaining decoders within the system. In addition, the message packet used in the present invention system includes a program tag which identifies the program channel together with a market code identifier which in turn establishes the group of decoders intended to respond to the program signal. Certain other control and operational information are also provided within the message packet which need not be described further here.

Thus, once controller 60 has recovered the message packet from the recovered baseband signal, an initial determination is made as to whether the decoder identifies and/or market code of the received program correspond to the identifier of decoder 40 and a market code which decoder 40 is authorized to receive. It should be noted that both the decoder address or identifier and market code information are stored within address memory 64 and coupled to controller 60 by communication line 75 for use in this process. Once a determination is made that decoder address or market code correspond to the stored information within address memory 64, controller 60 produces an address match logic signal on line 62 which is coupled to processor 50. The address match logic may be signaled from zero to four times. Each potential signal represents either one of three potential decoder identification matches or a market code match. Concurrently, portions of the message packet intended for use by processor 50 are passed to processor 50 by controller 60 using communication line 61.

Once the address match and market code examination is complete and a match is found, the program tag within the message packet is compared by controller 60 to the stored list of authorized programs within memory 64. In the event the program tag corresponds to an authorized program within the program list of memory 64, controller 60 produces an enabling signal on line 65 which activates descrambler 70 causing the scrambled video baseband signal from IF and detector 73 to be descrambled and returned to the conventional video baseband format. It should be recalled that descrambler 70 is required to essentially provide a complimentary or reciprocal action for the scrambler used within headend 10 (seen in FIG. 1). The output of descrambler 70 is coupled to modulator 71 and thereafter applied to television receiver 44 for display.

If, however, controller 60 determines that the program tag of the program message packet does not correspond to an authorized program within the list of controller 60, processor 50 and controller 60 cooperate to determine the next action of decoder 40 based upon information within the message packet indicating whether the program may be purchased or authorized on an individual or impulse pay per view basis. In accordance with an important aspect of the present invention, processor 50 determines decoder authorization level and immediately switches tuner 72 to receive the appropriate barkering channel from among a plurality of barkering channels at headend 10. In accordance with a further advantage of the present invention, processor 50 stores the original viewer input channel selection within memory 51 and retains the viewer selected channel number during the entire barkering and authorization process. Concurrently and in still further accordance with the present invention, processor 50 maintains the configuration of LED display 54 to continuously display the viewer selected channel input despite the multiple barkering which may take place. Thus, to the viewer, the barkering occurs without an apparent change of channel. If necessary, processor 50 may also produce information for display upon television receiver 44 using on-screen display 53 and modulator 71. Thus, once barkering has commenced, the viewer is presented with the appropriate barker message upon television receiver 44 without having undertaken any additional action beyond initially inputting a channel selection at viewer input 52.

If the selected channel is authorized for impulse pay per view, processor 50 automatically selects the appropriate one of the plurality of barkering channels to provide the corresponding displayed message on television receiver 44 which instructs the viewer to respond in a prescribed manner to obtain authorization. In many instances, the prescribed response simply requires that the viewer input a numeric code using input device 52. Following the correct viewer response and input, processor 50 produces a memory update communication which is coupled to address memory 64 via communication line 80 which adds the program tag corresponding to the now authorized impulse pay per view program to the program list within memory 64. Concurrently and in accordance with an important aspect of the present invention, processor 50 retrieves the stored original viewer channel selection number from memory 51 and switches tuner 72 back to the originally selected channel using the stored channel number. Once tuner 72 has been returned to the originally selected channel, controller 60 undertakes the above-described examination of the decoder address, market code and program tag of the message packet in the received signal. Because the above-described authorization process has place the program tag of the selected program channel within memory 64, controller 60 now determines that the selected program is authorized and produces an enabling signal which activates descrambler 70 and provides descrambled program information to modulator 71 which is displayed by television receiver 44.

If during the initial examination of the message packet controller 60 and processor 50 determine that the selected channel is not capable of impulse pay per view authorization, processor 50 switches tuner 72 to an alternate barkering channel which provides a message for display upon television receiver 44 appropriate to the unavailability of impulse pay per view authorization. It will be apparent to those skilled in the art that the capability of processor 50 to select the appropriate one of several barkering channels based upon authorization level or other criteria greatly increases the flexibility of the present invention system in that additional authorization procedures may be used for different levels of programming material. It should also be noted that these additional authorization procedures are carried forward while the originally selected channel number is retained within memory 51 and continues to be displayed upon LED display 54. Thus, the viewer is not required to interact extensively with decoder 40 to achieve authorization regardless of the method used. In essence, the viewer interaction remains that of simply responding to the instructional prompt on the barker display leaving the timing and other intricacies of authorization and interaction to processor 50 and controller 60. It will also be apparent that the present invention system facilitates the use of each of the barkering channels in connection with a great number of program channels thereby avoiding the need for individual barkering channels for each program. It should also be noted that the action of the present invention system in retaining the original viewer channel selection facilitates this multiple use of the barkering channels in that the viewer's response need not include the reinsertion of this program selection information since it is retained within memory 51 and is available to identify the desired program once the viewer responds.

Figure 3:
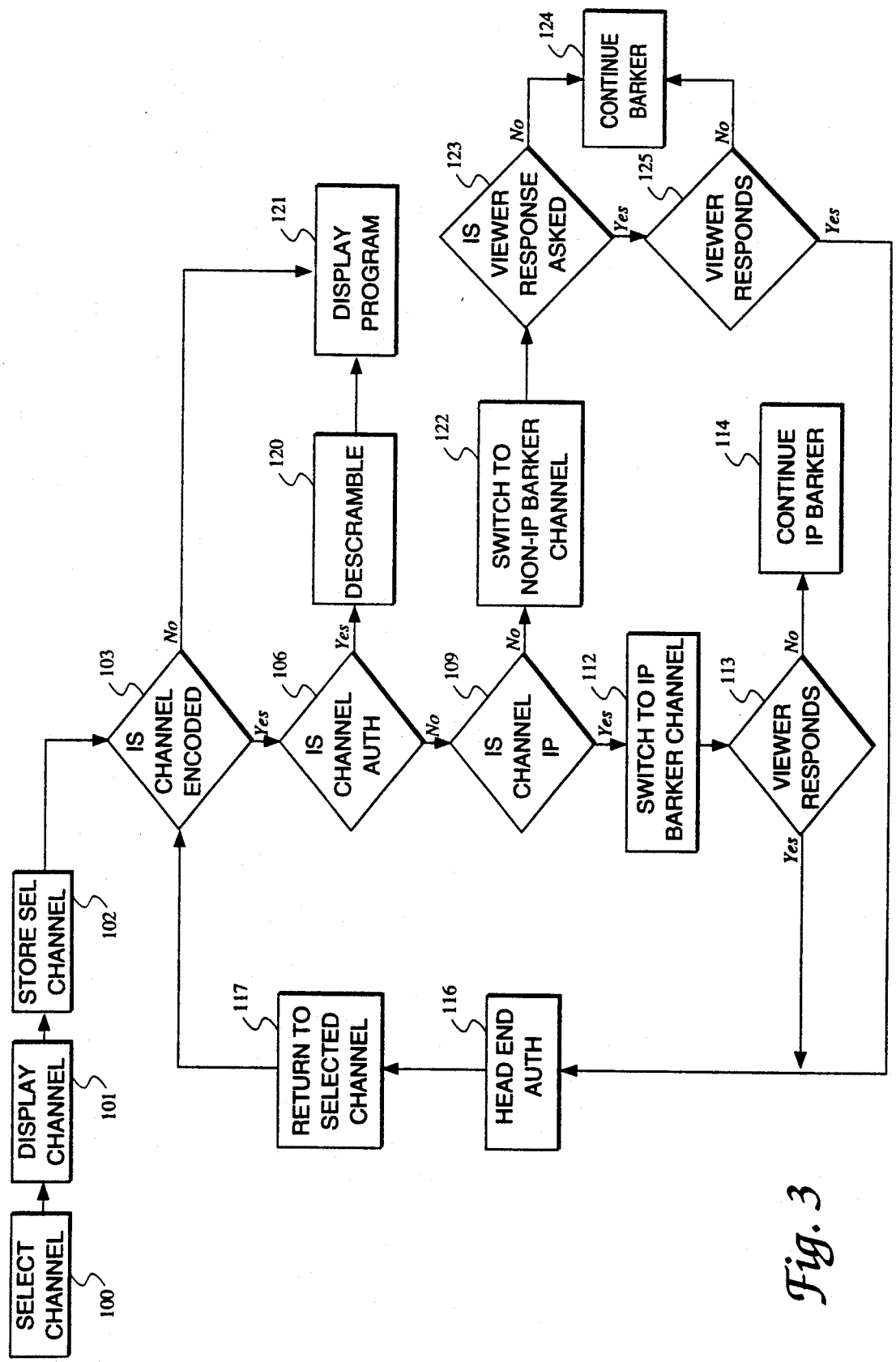
FIG. 3 sets forth a flow diagram of the operation of the decoder of FIG. 2 providing the present invention multiple barkering.

FIG. 3 sets forth a flow diagram for the operation of processor 50 and controller 60 in the present invention multiple barkering system. The process is initiated at a channel selection step 100 in which the viewer provides an input selection signal corresponding to the desired program channel. Thereafter, the system moves to a step 101 in which the selected program channel is displayed and thereafter to a step 102 in which the selected channel viewer input is stored within memory. Following step 102, the system moves to a decision step 103 in which a determination is made as to whether the program channel is an encoded channel.

It should be noted that within certain cable television systems, some channels are provided in a non-encoded format which permits the system decoders to simply function as channel converters and process the selected signal directly for display upon the television receiver. Accordingly, in the event it is determined at step 103 that the selected channel is not an encoded channel, the system moves directly to step 121 in which the program is played upon the television receiver. If, however, the selected program is an encoded program channel, the system moves to a decision step 106 in which a determination is made as to whether the program channel is authorized for reception by the decoder. In the event the selected program channel is authorized, the system moves to a step 120 in which the previously scrambled program signal is descrambled and thereafter to step 121 in which the program information is displayed upon the television receiver.

If it is determined at step 106 that the selected program channel is not authorized for reception by the decoder, the system moves to a step 109 in which a determination is made as to whether program channel authorization may be obtained on an individual or impulse pay per view basis. If impulse pay per view is authorized or available, the system moves to a step 112 in which the decoder is switched to an impulse pay per view barker channel which causes the television receiver to display the appropriate information and instructions which permit the viewer to obtain authorization on an impulse pay per view basis. Thereafter, the system moves to a decision step 113 in which a determination is made as to whether the viewer responds to the barker channel information in the appropriate manner. In the event the viewer fails to properly respond, the system moves to a step 114 in which the impulse pay per view barker channel is continued. If, however, the viewer responds to indicate the desire to obtain impulse pay per view authorization, the system moves to a step 116 in which the authorization request is communicated to the headend portion of the cable system and the program channel is authorized. Thereafter, the system moves to step 117 in which the decoder is returned to the original viewer selected program channel. The system then returns to step 103 and a determination is made that the program channel is an encoded channel. The system then moves to step 106 in which a determination is made that the program channel is now authorized which results in the system moving to step 120 in which the program signal is descrambled afterwhich the system moves to step 121 and the selected program is displayed upon the television receiver.

Returning to step 109, in the event a determination is made at step 109 that the unauthorized channel is not available for authorization on an impulse pay per view basis, the system moves to a step 122 in which the decoder is switched to a nonimpulse pay per view barker channel which provides appropriate information and instruction to the viewer related to the viewer's selection of an unauthorized pay per view program channel which is not available on an impulse pay per view basis. The nature of the instruction available on the nonimpulse pay per view barker channel is subject to some variation. For example, the information on the barker channel provided at step 122 may be entirely promotional material which does not solicit a viewer response. Alternatively, the barker information may solicit a viewer response different from that solicited in the barker channel information at step 112. Thus, following step 122, the system determines at a step 123 whether a viewer response is solicited by the barker channel. If no viewer response is solicited, the system moves to step 124 and continues the promotional barker channel presentation. If, however, a viewer response is solicited and instructions are given for obtaining authorization on some basis other than the impulse pay per view basis, the system moves to step 125 in which the viewer response is determined. If the viewer does not respond, the system returns to step 124 and continues the barker presentation. If, however, the viewer responds appropriately, the system moves to step 116 in which authorization is provided at the system headend. Thereafter, the system carries forward the above-described process in which the decoder is returned to the originally selected program channel at step 117 and moves through steps 103 and 106 to determine the authorization of the selected program channel afterwhich the information is descrambled at step 120 and displayed at step 121.

What has been shown is a cable television system having multiple barkering capability in which the selection of an unauthorized program channel by the viewer results in the presentation of a selected one of a plurality of barker channels. The barker channel selection is determined in accordance with the authorization status of the selected unauthorized program channel. For selected program channels capable of impulse pay per view authorization, an appropriate barker channel is selected which provides information to the viewer for obtaining impulse pay per view authorization. If impulse pay per view authorization is not available, the system switches to an alternate barker channel which provides appropriate information to the viewer. The alternate barker information may be simply promotional material or may instruct the viewer as to an alternative method of obtaining authorization. The system facilitates the use of each barker channel for a plurality of program channels and avoids the need for individual program channel barkering. During the barkering process, the originally selected program channel is stored within memory and is utilized to automatically switch the decoder to the originally selected program channel once authorization is obtained. The barker channel switching and return to the originally selected program channel is invisible to the viewer due to the retention of the originally selected program channel on the decoder channel displays.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in a cable television system having a headend and a plurality of user decoders, a multiple barkering transmission system comprising:

means for transmitting a plurality of scrambled program signals upon a plurality of program channels and a first user response soliciting barker message and a second barker message upon first and second respective barkering channels from said headend;

decoder means for receiving said plurality of program channels and said first and second barkering channels at a user decoder;

input means for accepting a user program channel input and selecting a selected program channel in response thereto while storing and displaying said user input;

means for determining the authorization level of said selected program channel for said decoder and based upon said authorization level operating the input means for selecting said unscrambling said selected program channel, or selecting said first barkering channel or said second barkering channel; and means for responding to selection of said first barkering channel and the solicited user response thereto for operating said input means for selecting and unscrambling said selected program channel.

2. A multiple barkering transmission system as set forth in claim 1 wherein said means for transmitting includes means for inserting a message packet having program authorization information therein into said program signals and wherein said means for determining includes means for recovering said message packet.

3. A multiple barkering transmission system as set forth in claim 2 wherein each of said decoder means maintains a stored list of previously authorized program channels and wherein said message packet for said program channels includes a program identifier.

4. A multiple barkering transmission system as set forth in claim 3 wherein said means for determining includes means for comparing said identifier to said stored program list and displaying said selected program channel if said identifier corresponds to an authorized program channel within said list.

5. A multiple barkering transmission system as set forth in claim 4 wherein said message packet for selected ones of said program signals indicates that authorization for display may be obtained by the user if said identifier is not found on said decoder's stored list as individual pay per view.

6. A multiple barkering transmission system as set forth in claim 5 wherein said means for determining selects said first barkering channel when an unauthorized individual pay per view authorization level is found.

7. A multiple barkering transmission system as set forth in claim 6 wherein said first and second barkering channels are selectable for a plurality of said program channels.

8. For use in a cable television system having a headend and a plurality of user decoders, a multiple barkering transmission method comprising the steps of:

transmitting a plurality of scrambled program signals upon a plurality of program channels and a first user response soliciting barker message and a second barker message upon first and second respective barkering channels from said headend;

receiving said plurality of program channels and said first and second barkering channels at a user decoder;

accepting a user program channel input and selecting a selected program channel in response thereto while storing and displaying said user input;

determining the authorization of said selected program channel for said decoder and based upon said authorization level selecting and unscrambling said selected program channel, or selecting said first barkering channel or said second barkering channel; and responding to selection of said first barkering channel and the solicited user response thereto for selecting and unscrambling said selected program channel.

9. The method set forth in claim 8 wherein said transmitting step includes inserting a message packet having program authorization information therein into said program signals and wherein said determining step includes recovering said message packet.

10. The method set forth in claim 9 wherein each of said decoders maintains a stored list of previously authorized program channels and wherein said message packet for said program channels includes a program identifier.

11. The method set forth in claim 10 wherein said determining step includes comparing said identifier to said stored program list and displaying said selected program channel if said identifier corresponds to an authorized program channel within said list.

12. The method set forth in claim 11 wherein said message packet for selected ones of said program signals indicates that authorization for display may be obtained by the user if said identifier is not found on said decoder's stored list as individual pay per view.

13. The method of claim 12 wherein said determining step selects said first barkering channel when an unauthorized individual pay per view authorization level is found.

14. The method of claim 13 wherein said first and second barkering channels are selectable for a plurality of said program channels.

15. In a cable television system in which a plurality of program signals are transmitted from a headend unit to a plurality of decoders via a cable distribution network and in which program authorization signals defining authorized, impulse pay or nonimpulse pay authorization states are inserted into a portion of the program signals, a multiple barkering method comprising the steps of:

modulating first and second barkering messages upon first and second barkering channel carriers;

modulating a plurality of scrambled program signals, having program information signals encoded into portions thereof;

transmitting said first and second barkering carriers and said plurality of program channel carriers upon a cable distribution system;

receiving said transmitted first and second barkering carriers and said plurality of program channel carriers;

accepting a viewer selection of a desired one of said program channel carriers as a selected program channel and displaying and storing the channel number of said selected program channel;

examining the encoded program authorization signals of the selected channel program signal to determine the authorization state of the program signal;

alternatively selecting and unscrambling said program signal of said selected program channel if an authorized state is determined or selecting either said first or second barkering carriers when said program authorization signals exhibit an impulse pay authorization state or a nonimpulse pay per view authorization state respectively; and selecting and unscrambling said selected channel when a response to said first barkering message is received.

* * * * *